United States Patent
Kanzaki et al.

(10) Patent No.: US 11,315,734 B2
(45) Date of Patent: Apr. 26, 2022

(54) MULTILAYER CERAMIC CAPACITOR AND METHOD FOR MANUFACTURING MULTILAYER CERAMIC CAPACITOR

(71) Applicant: Murata Manufacturing Co., Ltd., Nagaokakyo (JP)

(72) Inventors: Taisuke Kanzaki, Nagaokakyo (JP); Satoshi Muramatsu, Nagaokakyo (JP); Kosuke Onishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 58 days.

(21) Appl. No.: 16/788,427

(22) Filed: Feb. 12, 2020

(65) Prior Publication Data

US 2020/0312565 A1  Oct. 1, 2020

(30) Foreign Application Priority Data

Mar. 28, 2019 (JP) .............................. JP2019-064996

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/1209* (2013.01); *H01G 4/2325* (2013.01)

(58) Field of Classification Search
CPC ...... H01G 4/248; H01G 4/012; H01G 4/1209; H01G 4/232; H01G 4/30; H01G 4/0085; H01G 4/1227; H01G 4/2325
See application file for complete search history.

(56) References Cited

U.S. PATENT DOCUMENTS

2007/0242416 A1* 10/2007 Saito .................... H01G 4/2325
  361/321.1
2011/0051314 A1*  3/2011 Sakurai ................ H01G 4/2325
  361/321.1
(Continued)

FOREIGN PATENT DOCUMENTS

JP       2000-100647 A      4/2000
JP       2006-161127 A      6/2006
(Continued)

OTHER PUBLICATIONS

Official Communication issued in corresponding Japanese Patent Application No. 2019-064996, dated Oct. 27, 2021.

*Primary Examiner* — Michael P McFadden
(74) *Attorney, Agent, or Firm* — Keating & Bennett, LLP

(57) ABSTRACT

A multilayer ceramic capacitor includes a capacitive element including ceramic layers and internal electrodes, and external electrodes on the capacitive element. The external electrodes include a Ni underlying electrode layer mainly made of Ni, a Cu plating electrode layer, and at least one second plating electrode layer. The Cu plating electrode layer includes a Ni diffused Cu plating electrode layer on a side closer to the Ni underlying electrode layer and including Ni diffused therein and a non-Ni diffused Cu plating electrode layer on a side closer to the second plating electrode layer and not including Ni diffused therein. The Cu plating electrode layer has a thickness of about 3 μm or more and about 12 μm or less and the non-Ni diffused Cu plating electrode layer has a thickness of about 0.5 μm or more.

11 Claims, 6 Drawing Sheets

(51) Int. Cl.
*H01G 4/12* (2006.01)
*H01G 4/232* (2006.01)

(56) References Cited

U.S. PATENT DOCUMENTS

| | | | |
|---|---|---|---|
| 2011/0290542 A1* | 12/2011 | Nishisaka | H01C 7/008 |
| | | | 174/257 |
| 2013/0279073 A1* | 10/2013 | Nishisaka | H01G 4/12 |
| | | | 361/301.4 |
| 2014/0204502 A1* | 7/2014 | Chun | H01G 4/2325 |
| | | | 361/301.4 |
| 2014/0321025 A1* | 10/2014 | Saito | C25D 5/505 |
| | | | 361/305 |
| 2015/0016018 A1* | 1/2015 | Onishi | H01C 7/008 |
| | | | 361/301.4 |
| 2018/0286583 A1* | 10/2018 | Onoue | H01G 4/232 |

FOREIGN PATENT DOCUMENTS

| | | |
|---|---|---|
| JP | 2012-009813 A | 1/2012 |
| JP | 2017-168488 A | 9/2017 |

* cited by examiner

MULTILAYER CERAMIC CAPACITOR AND METHOD FOR MANUFACTURING MULTILAYER CERAMIC CAPACITOR

CROSS REFERENCE TO RELATED APPLICATIONS

This application claims the benefit of priority to Japanese Patent Application No. 2019-064996 filed on Mar. 28, 2019. The entire contents of this application are hereby incorporated herein by reference.

BACKGROUND OF THE INVENTION

1. Field of the Invention

The present invention relates to a multilayer ceramic capacitor, and more particularly, to a multilayer ceramic capacitor having improved moisture resistance and an external electrode having improved strength, and to a method for manufacturing a multilayer ceramic capacitor.

2. Description of the Related Art

A typical multilayer ceramic capacitor includes a capacitive element in which a plurality of ceramic layers and a plurality of internal electrodes are deposited in layers, and has external electrodes formed on an external surface of the capacitive element. The internal electrodes are drawn out to the end, side or other surfaces of the capacitive element and connected to the external electrodes.

The external electrode includes, for example, an underlying electrode layer formed by applying and firing a conductive paste, and a plating electrode layer formed on an external surface of the underlying electrode layer. The plating electrode layer may include a plurality of layers as necessary.

For example, Japanese Patent Laid-Open No. 2017-168488 discloses a multilayer ceramic capacitor including an external electrode that includes an underlying electrode layer mainly composed of Ni and formed by printing a conductive paste, a Cu plating electrode layer formed on an external surface of the underlying electrode layer, a Ni plating electrode layer formed on an external surface of the Cu plating electrode layer, and a Sn plating electrode layer formed on an external surface of the Ni plating electrode layer.

It is believed that the multilayer ceramic capacitor disclosed in Japanese Patent Laid-Open No. 2017-168488 is provided with the Cu plating electrode layer mainly to enhance moisture resistance.

However, the underlying electrode layer mainly composed of Ni and the Cu plating electrode layer are different in material and how they are formed, and thus do not have strong adhesion (or large bonding strength). Therefore, in the multilayer ceramic capacitor disclosed in Japanese Patent Laid-Open No. 2017-168488, peeling may occur between the underlying electrode layer mainly composed of Ni and the Cu plating electrode layer, and the external electrodes may be damaged. In addition, moisture reaches the internal electrodes through a gap formed by peeling between the underlying electrode layer mainly composed of Ni and the Cu plating electrode layer or the like, and the multilayer ceramic capacitor may have characteristics that are impaired due to poor moisture resistance.

A countermeasure against this problem is disclosed in Japanese Patent Laid-Open No. 2012-9813.

Japanese Patent Laid-Open No. 2012-9813 discloses a multilayer ceramic capacitor formed by forming a Cu plating electrode layer on an underlying electrode layer and subsequently performing a heat treatment to diffuse a metal (for example, Ni) in the underlying electrode layer into the Cu plating electrode layer (hereinafter, also referred to as a "first multilayer ceramic capacitor of Japanese Patent Laid-Open No. 2012-9813"). Japanese Patent Laid-Open No. 2012-9813 describes that the first multilayer ceramic capacitor has metal (for example, Ni) diffused in a surface layer of the Cu plating electrode layer closer to the underlying electrode layer, and adhesion of the underlying electrode layer and the Cu plating electrode layer is enhanced. In the above heat treatment, it is believed that Cu in the Cu plating electrode layer is also diffused into the underlying electrode layer.

Furthermore, Japanese Patent Laid-Open No. 2012-9813 discloses a multilayer ceramic capacitor formed by forming a first Cu plating electrode layer on an underlying electrode layer and thereafter performing a heat treatment to diffuse a metal (e.g., Ni) in the underlying electrode layer into the first Cu plating layer, and subsequently forming a second Cu plating electrode layer on the first Cu plating electrode layer (hereinafter also referred to as a "second multilayer ceramic capacitor of Japanese Patent Laid-Open No. 2012-9813"). Japanese Patent Laid-Open No. 2012-9813 describes that the second multilayer ceramic capacitor has metal (for example, Ni) diffused in a surface layer of the first Cu plating electrode layer closer to the underlying electrode layer, and adhesion of the underlying electrode layer and the first Cu plating electrode layer is enhanced.

The first multilayer ceramic capacitor disclosed in Japanese Patent Laid-Open No. 2012-9813 has metal (for example, Ni) in the underlying electrode layer diffused in a surface layer of the Cu plating electrode layer closer to the underlying electrode layer, and adhesion of the underlying electrode layer and the Cu plating electrode layer is enhanced. However, Japanese Patent Laid-Open No. 2012-9813 does not disclose to what extent the metal in the underlying electrode layer should be diffused into the Cu plating electrode layer.

In the heat treatment performed to diffuse the metal in the underlying electrode layer into the Cu plating electrode layer, not only the metal in the underlying electrode layer diffuses into the Cu plating electrode layer, but also Cu in the Cu plating electrode layer diffuses into the underlying electrode layer. And voids are formed in the Cu plating electrode layer as Cu escapes therefrom.

Therefore, if the heat treatment for diffusing the metal contained in the underlying electrode layer into the Cu plating electrode layer is excessively performed, the first multilayer ceramic capacitor disclosed in Japanese Patent Laid-Open No. 2012-9813 would have the Cu plating electrode layer with its front and back sides connected through the voids, and there is a possibility that the external electrodes (the Cu plating electrode layer) may have reduced moisture resistance.

In contrast, the second multilayer ceramic capacitor disclosed in Japanese Patent Laid-Open No. 2012-9813 has the metal in the underlying electrode layer diffused into the surface layer of the first Cu plating electrode layer closer to the underlying electrode layer, and adhesion of the underlying electrode layer and the Cu plating electrode layer is enhanced. Further, even if the heat treatment for diffusing the metal contained in the underlying electrode layer into the first Cu plating electrode layer is excessively performed, the second multilayer ceramic capacitor disclosed in Japanese Patent Laid-Open No. 2012-9813 maintains sufficient moisture resistance as the second Cu plating electrode layer exists.

However, manufacturing the second multilayer ceramic capacitor disclosed in Japanese Patent Laid-Open No. 2012-9813 requires the step of forming the first Cu plating electrode layer and the step of forming the second Cu plating electrode layer, which is cumbersome and less productive.

SUMMARY OF THE INVENTION

Preferred embodiments of the present invention provide multilayer ceramic capacitors each having large moisture resistance and including an external electrode having large strength, and methods of manufacturing multilayer ceramic capacitors.

A multilayer ceramic capacitor according to a preferred embodiment of the present invention includes a ceramic capacitive element including a stack of a plurality of ceramic layers and a plurality of internal electrodes, and including a pair of major surfaces opposite to each other in a heightwise direction, a pair of end surfaces opposite to each other in a lengthwise direction orthogonal or substantially orthogonal to the heightwise direction, and a pair of side surfaces opposite to each other in a widthwise direction orthogonal or substantially orthogonal to the heightwise direction and the lengthwise direction; and at least two external electrodes on an external surface of the capacitive element, the internal electrodes extending to an external surface of the capacitive element at the end surfaces and/or the side surfaces and connected to the external electrodes, the external electrodes including a Ni underlying electrode layer on an external surface of the capacitive element and mainly made of Ni, a Cu plating electrode layer on an external surface of the Ni underlying electrode layer, and at least one second plating electrode layer on an external surface of the Cu plating electrode layer, the Cu plating electrode layer being made of a Ni diffused Cu plating electrode layer on a side closer to the Ni underlying electrode layer and including Ni diffused therein and a non-Ni diffused Cu plating electrode layer on a side closer to the second plating electrode layer and free of Ni diffused therein, the Cu plating electrode layer having a thickness of about 3 µm or more and about 12 µm or less, the non-Ni diffused Cu plating electrode layer having a thickness of about 0.5 µm or more.

A method for manufacturing a multilayer ceramic capacitor according to a preferred embodiment of the present invention includes preparing a ceramic green sheet; applying a conductive paste on a major surface of the ceramic green sheet in a desired shape to form an internal electrode; depositing a plurality of such ceramic green sheets in layers and integrating the sheets together to form a green capacitive element; applying a conductive paste to an external surface of the green capacitive element in a desired shape to form a Ni underlying electrode layer; firing the green capacitive element to produce a capacitive element including a plurality of ceramic layers and a plurality of internal electrodes deposited in layers, and the Ni underlying electrode layer formed on an external surface; forming a Cu plating electrode layer on an external surface of the Ni underlying electrode layer; applying a heat treatment to the capacitive element to diffuse Ni in the Ni underlying electrode layer into the Cu plating electrode layer to form in the Cu plating electrode layer a Ni diffused Cu plating electrode layer formed on a side closer to the Ni underlying electrode layer and having Ni diffused therein and a non-Ni diffused Cu plating electrode layer formed on a side closer to a second plating electrode layer and free of Ni diffused therein; and forming at least one second plating electrode layer on an external surface of the Cu plating electrode layer, the Cu plating electrode layer having a thickness of about 3 µm or more and about 12 µm or less, the non-Ni diffused Cu plating electrode layer having a thickness of about 0.5 µm or more.

The multilayer ceramic capacitors of preferred embodiments of the present invention each have large moisture resistance and also include an external electrode having large strength.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings.

Each preferred embodiment described below is an example of a preferred embodiment of the present invention, and the present invention is not limited to the content of the preferred embodiments. Moreover, it is also possible to combine the contents described in different preferred embodiments, and the contents of such combinations are also included in the present invention. Further, the drawings are intended to facilitate understanding the specification and may be schematically drawn, and the drawn components or their dimensional ratios may not match those described in the specification. In addition, some of components described in the specification may not be shown in a figure or may be drawn differently in number.

First Preferred Embodiment

Figure 1:
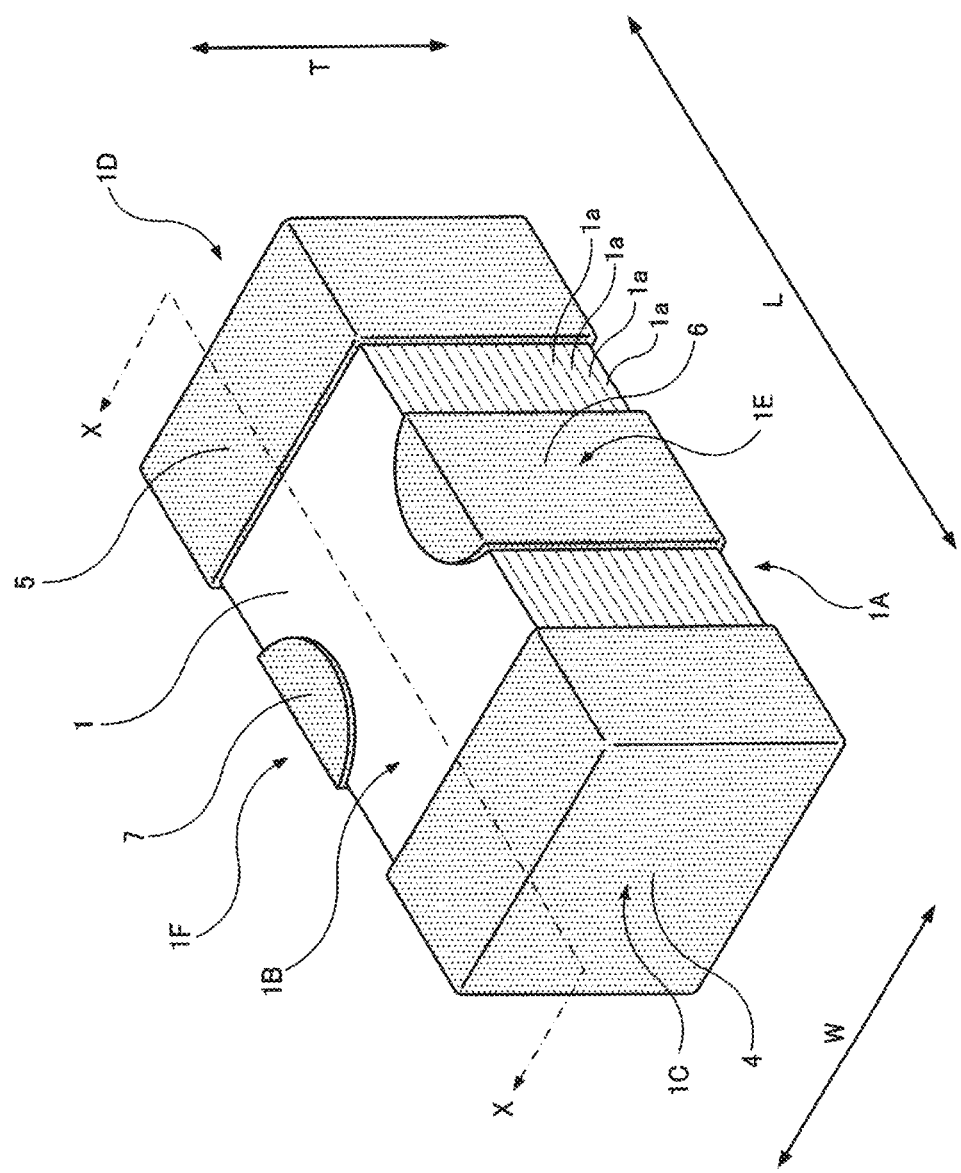
FIG. 1 is a perspective view of a multilayer ceramic capacitor 100 according to a first preferred embodiment of the present invention.
Figure 2:
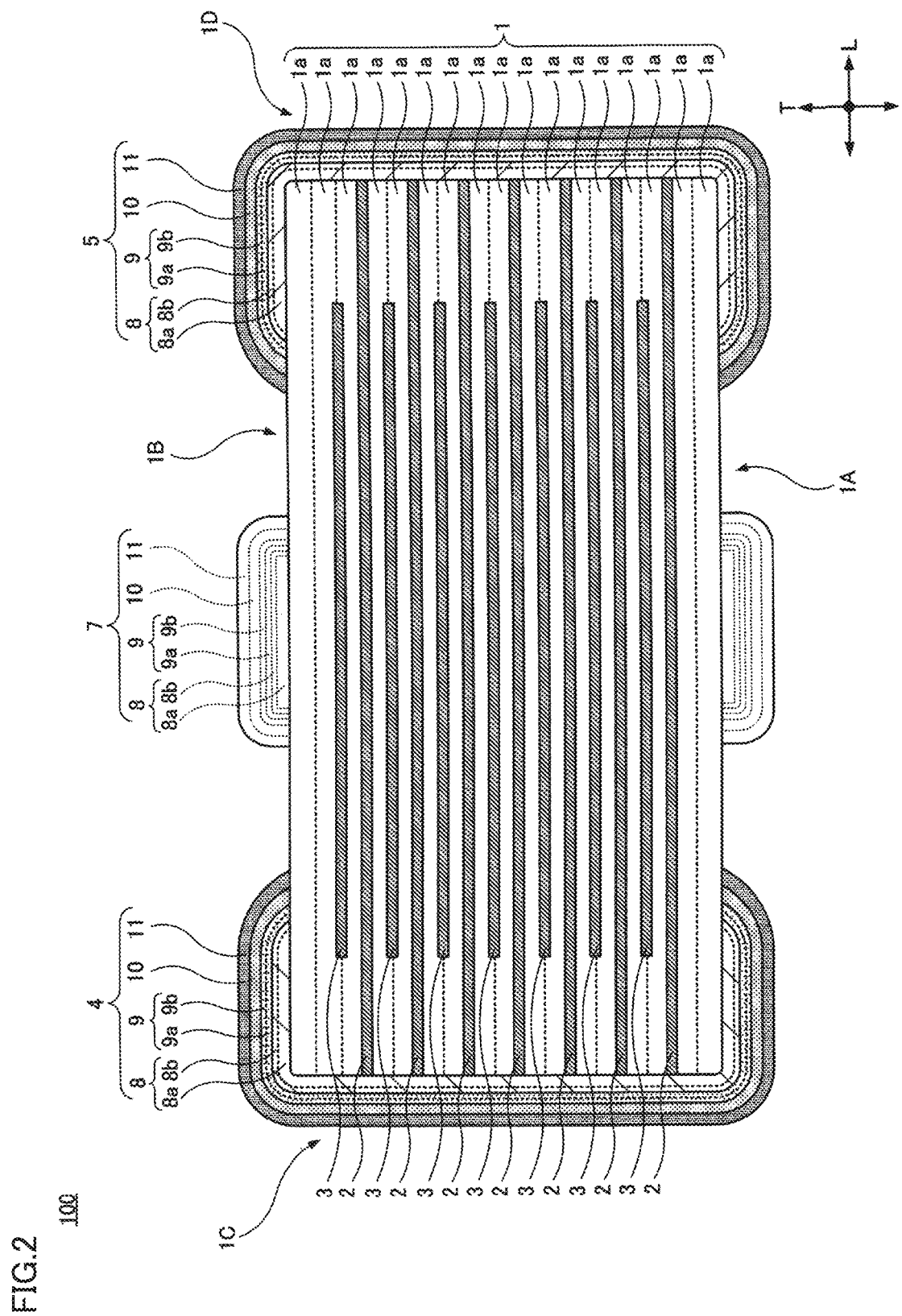
FIG. 2 is a cross section of multilayer ceramic capacitor 100.
Figure 3:
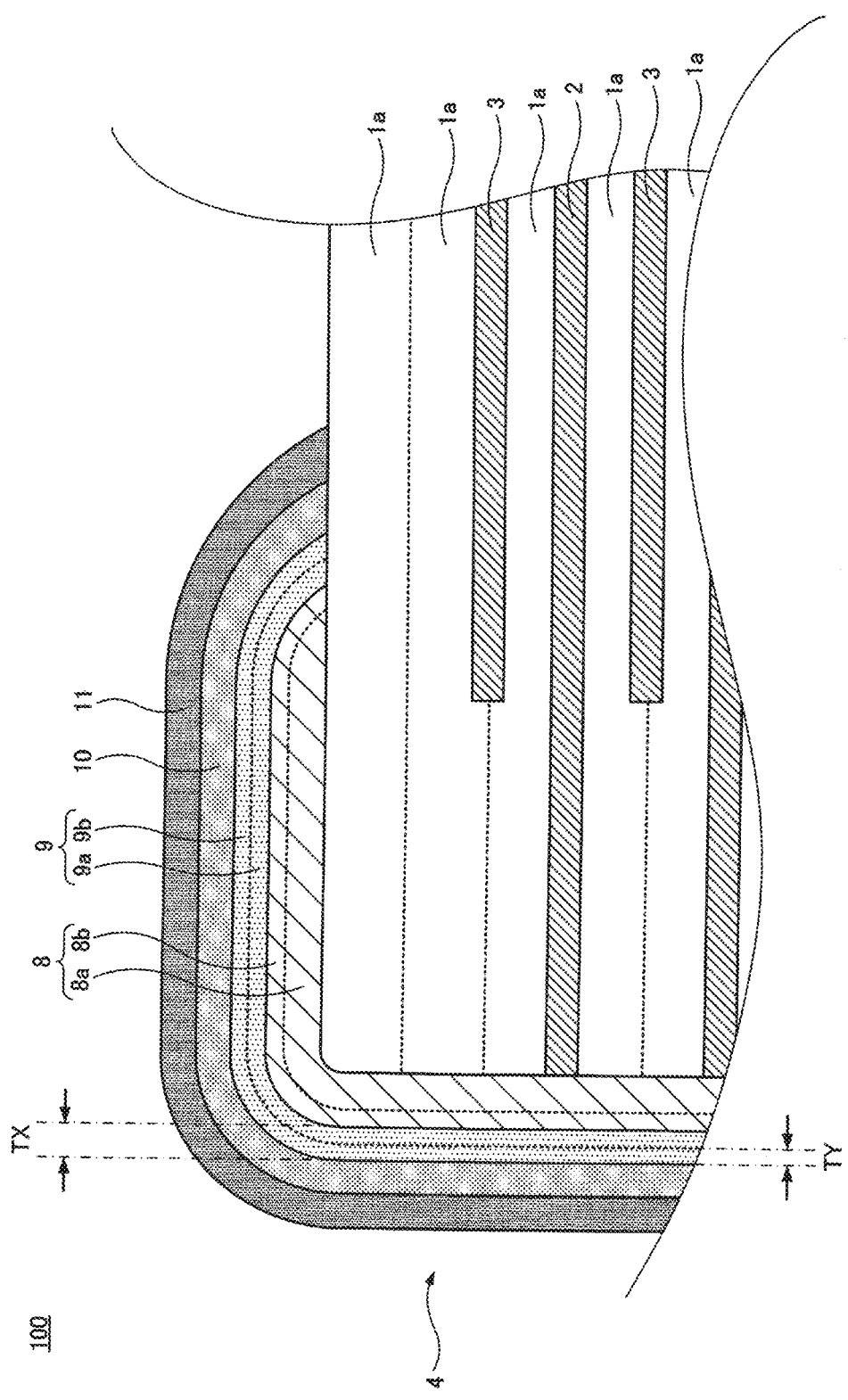
FIG. 3 is a cross section of a main portion of multilayer ceramic capacitor 100.
Figure 4:
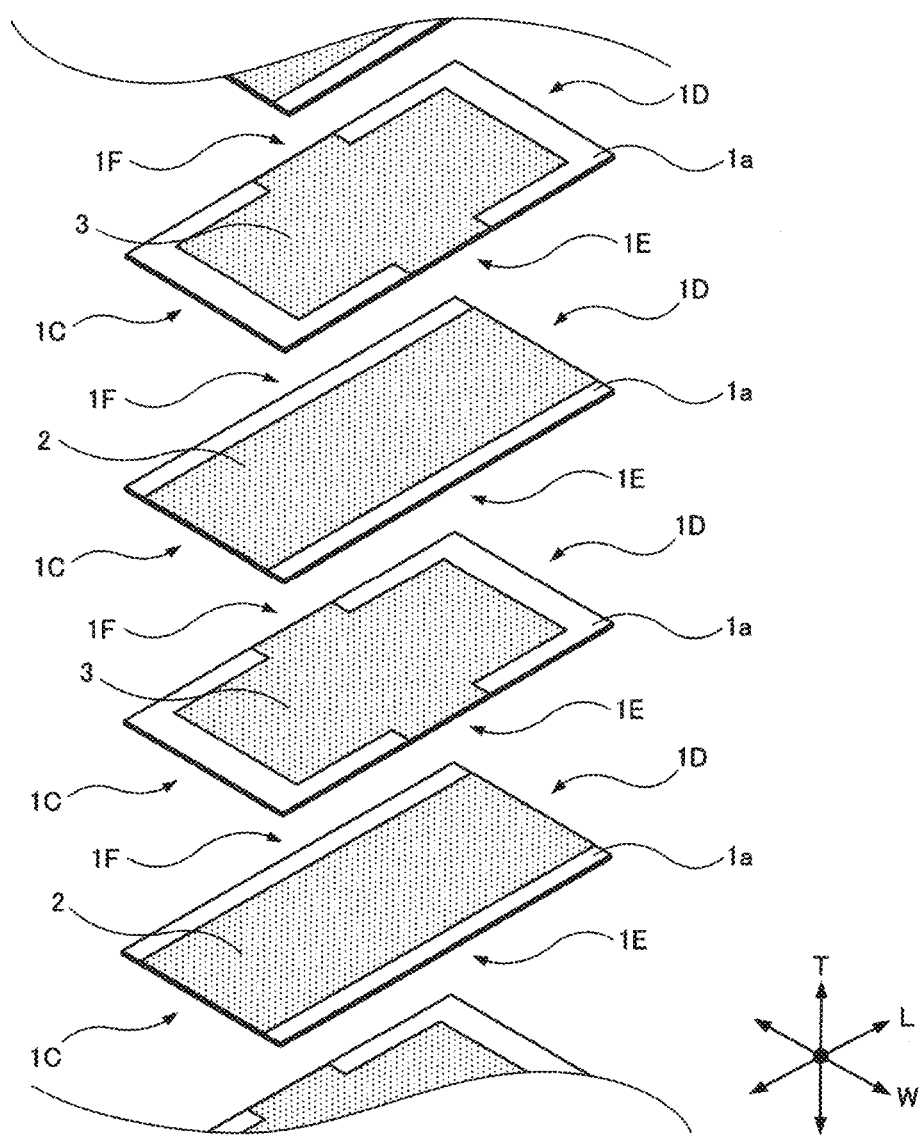
FIG. 4 is an exploded perspective view of multilayer ceramic capacitor 100.

FIGS. 1 to 4 show a multilayer ceramic capacitor 100 according to a first preferred embodiment of the present invention. FIG. 1 is a perspective view of multilayer ceramic capacitor 100. FIG. 2 is a cross section of multilayer ceramic capacitor 100, and shows a portion X-X indicated in FIG. 1 by an arrowed, one-dot chain line. FIG. 3 is a cross section of a main portion of multilayer ceramic capacitor 100. FIG. 4 is an exploded perspective view of multilayer ceramic capacitor 100. The figures indicate a heightwise direction T, a lengthwise direction L, and a widthwise direction W of multilayer ceramic capacitor 100, and these directions may be referred to in the following description. In the present preferred embodiment, a direction in which ceramic layers 1a described hereinafter are stacked is defined as heightwise direction T of multilayer ceramic capacitor 100.

Multilayer ceramic capacitor 100 includes capacitive element 1 having a rectangular or substantially rectangular parallelepiped shape. Capacitive element 1 includes a pair of major surfaces 1A and 1B opposite to each other in heightwise direction T, a pair of end surfaces 1C and 1D opposite to each other in lengthwise direction L orthogonal or substantially orthogonal to heightwise direction T, and a pair of side surfaces 1E and 1F opposite to each other in widthwise direction W orthogonal or substantially orthogonal to both heightwise direction T and lengthwise direction L.

Multilayer ceramic capacitor 100 may have any dimensions. However, a dimension in heightwise direction T can, for example, preferably be about 0.1 mm to about 2.5 mm. A dimension in lengthwise direction L can, for example, preferably be about 0.1 mm to about 3.2 mm. A dimension in widthwise direction W can, for example, be about 0.1 mm to about 2.5 mm.

Capacitive element 1 includes a plurality of ceramic layers 1a and a plurality of internal electrodes 2 and 3 disposed in layers. Internal electrode 2 corresponds to a first internal electrode, and internal electrode 3 corresponds to a second internal electrode.

While capacitive element 1 (ceramic layer 1a) may be made of any material, it can, for example, preferably be a dielectric ceramic material mainly including $BaTiO_3$. $BaTiO_3$ may be replaced with a dielectric ceramic material mainly including another material, such as $CaTiO_3$, $SrTiO_3$, $CaZrO_3$, for example.

While ceramic layer 1a may have any thickness, it can, for example, preferably be about 0.3 μm to about 2.0 μm in an effective capacitance formation region in which internal electrodes 2 and 3 are provided.

While ceramic layer 1a may be any number of layers, it can, for example, preferably be 1 to 6,000 layers in the effective capacitance formation region in which internal electrodes 2 and 3 are provided.

On the upper and lower sides of capacitive element 1, external layers (protective layers) not including internal electrodes 2 and 3 provided thereon and including only ceramic layer 1a are provided. While the external layer may have any thickness, it can, for example, preferably be about 15 μm to about 150 μm. Ceramic layer 1a in the region of the external layer may be larger in thickness than ceramic layer 1a in the effective capacitance formation region in which internal electrodes 2 and 3 are provided, although FIGS. 2 and 3 show the external layer's region and the effective region with ceramic layers 1a equal or substantially equal in thickness. Further, ceramic layer 1a in the external layer's region may be made of a different material from ceramic layer 1a in the effective region.

The exploded perspective view of FIG. 4 is an exploded view of a vicinity of the center of capacitive element 1 in heightwise direction T for each ceramic layer 1a. As can be seen from FIG. 4, internal electrodes 2 extend in lengthwise direction L of multilayer ceramic capacitor 100 and extend to both end surfaces 1C and 1D of capacitive element 1. Internal electrodes 3 extend in lengthwise direction L of multilayer ceramic capacitor 100 and extend to both side surfaces 1E and 1F of capacitive element 1. In principle, internal electrodes 2 and 3 are alternately stacked.

While internal electrodes 2 and 3 may include any major component, it is preferably Ni, for example, in the present preferred embodiment. Ni may be replaced with other metals such as, for example, Cu, Ag, Pd, and Au. Ni, Cu, Ag, Pd, Au, and the like may be alloyed with other metals.

While internal electrodes 2 and 3 may have any thickness, it can, for example, preferably be about 0.3 μm to about 1.5 μm.

While a gap between internal electrode 2 and side surfaces 1E and 1F of capacitive element 1 may have any dimension, it can, for example, preferably be about 10 μm to about 200 μm. Further, while a gap between internal electrode 3 and end surfaces 1C and 1D of capacitive element 1 may have any dimension, it can, for example, preferably be about 0.5 μm to about 300 μm.

External electrodes 4, 5, 6, 7 are provided on an external surface of capacitive element 1.

External electrode 4 is provided on end surface 1C of capacitive element 1. External electrode 4 preferably has the shape of a cap, and includes an edge portion extending from end surface 1C of capacitive element 1 to major surfaces 1A, 1B and side surfaces 1E, 1F.

External electrode 5 is provided on end surface 1D of capacitive element 1. External electrode 5 preferably has the shape of a cap, and includes an edge portion extending from end surface 1D of capacitive element 1 to major surfaces 1A, 1B and side surfaces 1E, 1F.

External electrode 6 is provided on side surface 1E of capacitive element 1. External electrode 6 preferably has the shape of the letter C, and includes an edge portion extending from side surface 1E of capacitive element 1 to major surfaces 1A and 1B.

External electrode 7 is provided on side surface 1F of capacitive element 1. External electrode 7 preferably has the shape of the letter C, and includes an edge portion extending from side surface 1F of capacitive element 1 to major surfaces 1A and 1B.

In multilayer ceramic capacitor 100, internal electrode 2 extending to end surface 1C of capacitive element 1 is connected to external electrode 4. Internal electrode 2 extending to end surface 1D of capacitive element 1 is connected to external electrode 5. Internal electrode 3 extending to side surface 1E of capacitive element 1 is connected to external electrode 6. Internal electrode 3 extending to side surface 1F of capacitive element 1 is connected to external electrode 7.

Multilayer ceramic capacitor 100 in which internal electrode 2 is connected to external electrodes 4 and 5 and internal electrode 3 is connected to external electrodes 6 and 7 can be used as a three-terminal capacitor, for example. That is, multilayer ceramic capacitor 100 can be used as a three-terminal capacitor by dividing a power line or a signal line in a circuit, and connecting external electrodes 4 and 5 to one and the portions, respectively, of the divided line and grounding external electrodes 6 and 7. In that case, internal electrode 2 will define and function as a through electrode and internal electrode 3 will define and function as a ground electrode.

External electrodes 4 to 7 have the same or substantially the same multilayer structure. Specifically, as shown in FIGS. 2 and 3, external electrodes 4 to 7 each include a Ni underlying electrode layer 8 on an external surface of capacitive element 1, a Cu plating electrode layer 9 on an external surface of Ni underlying electrode layer 8, a Ni plating electrode layer 10 on an external surface of Cu plating electrode layer 9, and a Sn plating electrode layer 11 on an external surface of Ni plating electrode layer 10. Ni plating electrode layer 10 and Sn plating electrode layer 11 may be referred to as a second plating electrode added to an external surface of Cu plating electrode layer 9 in some cases.

Ni underlying electrode layer 8 includes a non-Cu diffused Ni underlying electrode layer 8a on a side closer to capacitive element 1 and not including Cu diffused therein, and a Cu diffused Ni underlying electrode layer 8b on a side closer to Cu plating electrode layer 9 and including Cu diffused therein. Cu plating electrode layer 9 includes a Ni diffused Cu plating electrode layer 9a on a side closer to Ni underlying electrode layer 8 and including Ni diffused therein, and a non-Ni diffused Cu plating electrode layer 9b on a side closer to the second plating electrode layer and not including Ni diffused therein.

Ni underlying electrode layer 8 is a portion defining and functioning as a base for external electrodes 4 to 7. Ni underlying electrode layer 8 is mainly made of Ni. However, it is also preferable that Ni underlying electrode layer 8 includes a ceramic material, since it can improve adhesion between capacitive element 1 and Ni underlying electrode layer 8. Furthermore, it is also preferable that Ni underlying electrode layer 8 includes a ceramic composition the same or substantially the same as that defining capacitive element 1, since it can further improve adhesion between capacitive element 1 and Ni underlying electrode layer 8.

While Ni underlying electrode layer 8 may have any thickness, it can, for example, preferably be about 9 μm to about 150 μm.

As has been described above, Ni underlying electrode layer 8 includes non-Cu diffused Ni underlying electrode layer 8a on a side closer to capacitive element 1 and not including Cu diffused therein, and Cu diffused Ni underlying electrode layer 8b on a side closer to Cu plating electrode layer 9 and including Cu diffused therein. A boundary between non-Cu diffused Ni underlying electrode layer 8a and Cu diffused Ni underlying electrode layer 8b is determined by whether Cu is detected when a cross section of Ni underlying electrode layer 8 is analyzed by WDX (Wavelength-Dispersive X-ray spectrometry). That is, a portion where Cu is not detected is non-Cu diffused Ni underlying electrode layer 8a, and a portion where Cu is detected is Cu diffused Ni underlying electrode layer 8b.

Cu included in Cu diffused Ni underlying electrode layer 8b is diffused from Cu plating electrode layer 9 by heat treatment. Cu diffused Ni underlying electrode layer 8b is provided to improve adhesion between Ni underlying electrode layer 8 (Cu diffused Ni underlying electrode layer 8b) and Cu plating electrode layer 9 (Ni diffused Cu plating electrode layer 9a).

Cu diffused Ni underlying electrode layer 8b is a portion where Cu is diffused from Cu plating electrode layer 9 by heat treatment and is also a portion to supply Ni to be diffused into Ni diffused Cu plating electrode layer 9a. That is, in Cu diffused Ni underlying electrode layer 8b and Ni diffused Cu plating electrode layer 9a, Ni and Cu are mutually diffused.

When a large amount of Cu is diffused from Cu plating electrode layer 9, Ni underlying electrode layer 8 may not be provided with non-Cu diffused Ni underlying electrode layer 8a, and may instead include only Cu diffused Ni underlying electrode layer 8b.

Cu plating electrode layer 9 mainly is provided to improve moisture resistance.

FIG. 3 shows Cu plating electrode layer 9 having a thickness TX of about 3 μm or more and about 12 μm or less, for example. This is because Cu plating electrode layer 9 with thickness TX smaller than about 3 μm would have a reduced moisture resistance function. Further, if Cu plating electrode layer 9 has thickness TX larger than about 12 μm, external electrodes 4 to 7 would have a thickness larger than necessary, and accordingly, capacitive element 1 must be reduced in size, and internal electrodes 2 and 3 must be reduced in area or ceramic layers 1a and internal electrodes 2 and 3 must be reduced in number, which may result in multilayer ceramic capacitor 100 having small capacitance.

While Cu plating electrode layer 9 may have any surface roughness RA, it can, for example, preferably be about 0.1 μm to about 1.0 μm.

As has been described above, Cu plating electrode layer 9 includes Ni diffused Cu plating electrode layer 9a and non-Ni diffused Cu plating electrode layer 9b. A boundary between Ni diffused Cu plating electrode layer 9a and non-Ni diffused Cu plating electrode layer 9b can be determined by whether Ni is detected when a cross section of Cu plating electrode layer 9 is analyzed by WDX. That is, a portion where Ni is detected is Ni diffused Cu plating electrode layer 9a, and a portion where Ni is not detected is non-Ni diffused Cu plating electrode layer 9b.

Ni included in Ni diffused Cu plating electrode layer 9a is diffused from Ni underlying electrode layer 8 by heat treatment. Ni diffused Cu plating electrode layer 9a is provided to improve adhesion between Ni underlying electrode layer 8 (Cu diffused Ni underlying electrode layer 8b) and Cu plating electrode layer 9 (Ni diffused Cu plating electrode layer 9a) and to improve fixation and reliability in moisture resistance.

Ni diffused Cu plating electrode layer 9a is a portion where Ni is diffused from Ni underlying electrode layer 8 by heat treatment and is also a portion to supply Cu to be diffused into Cu diffused Ni underlying electrode layer 8b. That is, as has been described above, in Cu diffused Ni underlying electrode layer 8b and Ni diffused Cu plating electrode layer 9a, Ni and Cu are mutually diffused.

Voids are provided in Ni diffused Cu plating electrode layer 9a after Cu exits to be supplied to Cu diffused Ni underlying electrode layer 8b. Therefore, Ni diffused Cu plating electrode layer 9a has small moisture resistance.

Ni diffused Cu plating electrode layer 9a with Ni diffused therein in a larger amount is more preferable, since adhesion between Ni underlying electrode layer 8 (Cu diffused Ni underlying electrode layer 8b) and Cu plating electrode layer 9 (Ni diffused Cu plating electrode layer 9a) is further improved.

Non-Ni diffused Cu plating electrode layer 9b is a portion of Cu plating electrode layer 9 where Ni is not diffused from Ni underlying electrode layer 8 despite heat treatment. Non-Ni diffused Cu plating electrode layer 9b maintains large moisture resistance even after heat treatment.

FIG. 3 shows non-Ni diffused Cu plating electrode layer 9b having a thickness TY of about 0.5 μm or more, for example, since if non-Ni diffused Cu plating electrode layer 9b that maintains large moisture resistance even after the heat treatment has thickness TY smaller than about 0.5 μm, then Cu plating electrode layer 9 will have reduced moisture resistance even though Cu plating electrode layer 9 is mainly provided to improve moisture resistance.

Non-Ni diffused Cu plating electrode layer 9b preferably has thickness TY of about 1 μm or more, for example, since it ensures that Cu plating electrode layer 9 maintains large moisture resistance.

Non-Ni diffused Cu plating electrode layer 9b more preferably has thickness TY of about 2 μm or more, for example, since it further ensures that Cu plating electrode layer 9 maintains large moisture resistance.

As has been described above, in the present preferred embodiment, the two layers of Ni plating electrode layer 10 and Sn plating electrode layer 11 correspond to the second plating electrode layer on an external surface of Cu plating electrode layer 9. However, the second plating electrode layer may be any number of layers, and may alternatively be one layer or three or more layers rather than two layers. The second plating electrode layer may include each layer made of any material, and it may be a plating electrode layer made of a metal other than Ni and Sn.

Ni plating electrode layer 10 mainly improves soldering heat resistance and also improves adhesion. Sn plating electrode layer 11 mainly improves solderability.

While Ni plating electrode layer 10 may have any thickness, it can, for example, preferably be about 2 μm to about 7 μm.

While Sn plating electrode layer 11 may have any thickness, it can, for example, preferably be about 1 μm to about 8 μm.

Cu plating electrode layer 9, Ni plating electrode layer 10, and Sn plating electrode layer 11 may each include impurities. Further, Cu plating electrode layer 9, Ni plating electrode layer 10, and Sn plating electrode layer 11 may each be an alloy.

Multilayer ceramic capacitor 100 having the above structure includes Ni underlying electrode layer 8 with Cu diffused Ni underlying electrode layer 8b included therein and Cu plating electrode layer 9 with Ni diffused Cu plating electrode layer 9a included therein, and thus includes Ni underlying electrode layer 8 (Cu diffused Ni underlying electrode layer 8b) and Cu plating electrode layer 9 (Ni diffused Cu plating electrode layer 9a) bonded together through strong adhesion. Therefore, in multilayer ceramic capacitor 100, Ni underlying electrode layer 8 and Cu plating electrode layer 9 do not easily peel off, and a gap is not easily provided therebetween. Therefore, multilayer ceramic capacitor 100 includes external electrodes 4 to 7 with large strength.

Furthermore, multilayer ceramic capacitor 100 includes Cu plating electrode layer 9 preferably with thickness TX of about 3 μm or more, for example, and thus, large moisture resistance.

Further, multilayer ceramic capacitor 100 includes Cu plating electrode layer 9 preferably with thickness TX of about 12 μm or less, for example, and accordingly, external electrodes 4 to 7 do not have a thickness larger than necessary, so that capacitive element 1 can have a sufficiently large size and, thus, large capacitance.

Furthermore, multilayer ceramic capacitor 100 includes non-Ni diffused Cu plating electrode layer 9b preferably with thickness TY of about 0.5 μm or more, for example, and Cu plating electrode layer 9 is not reduced in moisture resistance even after heat treatment.

Moisture Resistance Load Test

In order to confirm that preferred embodiments of the present invention are effective, the following moisture resistance load test was conducted.

Initially, a sample according to an Example of a preferred embodiment of the present invention was prepared. The sample according to the Example had a structure of multilayer ceramic capacitor 100 with Cu plating electrode layer 9 having thickness TX of about 3 μm and non-Ni diffused Cu plating electrode layer 9b having thickness TY of about 0.5 μm.

Subsequently, a sample according to Comparative Example 1 was prepared. The sample according to Comparative Example 1 included Cu plating electrode layer 9 with thickness TX of about 3 μm and non-Ni diffused Cu plating electrode layer 9b with thickness TY of about 3 μm. That is, the sample according to Comparative Example 1 was not heat-treated after Cu plating electrode layer 9 was provided, that is, Ni diffused Cu plating electrode layer 9a was not provided and Cu plating electrode layer 9 was entirely defined by non-Ni diffused Cu plating electrode layer 9b.

Subsequently, a sample according to Comparative Example 2 was prepared. The sample according to Comparative Example 2 included Cu plating electrode layer 9 with thickness TX of about 3 μm and non-Ni diffused Cu plating electrode layer 9b with thickness TY of about 0.4 μm.

Subsequently, a sample according to Comparative Example 3 was prepared. The sample according to Comparative Example 3 included Cu plating electrode layer 9 with thickness TX of about 3 μm and non-Ni diffused Cu plating electrode layer 9b with thickness TY of 0 μm. That is, after Cu plating electrode layer 9 was provided, the sample according to Comparative Example 3 was heat-treated to include Cu plating electrode layer 9 entirely defined by Ni diffused Cu plating electrode layer 9a, and non-Ni diffused Cu plating electrode layer 9b was not provided.

Subsequently, 10 samples according to the Example and 10 samples according to each of comparative examples 1 to 3 were each mounted on a glass epoxy substrate using eutectic solder. Subsequently, each sample's insulation resistance value was measured.

Subsequently, each glass epoxy substrate was placed in a high-temperature and high-humidity bath, and a voltage of about 3.2 V was applied to each sample for about 72 hours in an environment at about 125° C. and a relative humidity of about 95% RH. Subsequently, each sample's insulation resistance value after the moisture resistance load test was measured.

Any sample that had an insulation resistance value decreased by one digit or more before and after the moisture resistance load test was determined to be a defectively moisture resistant sample.

Table 1 shows the number of defectively moisture resistant samples for each of the Example and Comparative Examples 1 to 3.

TABLE 1

| | comparative example 1 | example | comparative example 2 | comparative example 3 |
|---|---|---|---|---|
| thickness of Cu plating electrode layer 9 (TX) | 3 μm | 3 μm | 3 μm | 3 μm |
| thickness of Ni diffused Cu plating electrode layer 9a | — | 2.5 μm | 2.6 μm | 3 μm |
| thickness of non-Ni diffused Cu plating electrode layer 9b (TY) | 3 μm | 0.5 μm | 0.4 μm | — |
| occurrence of defective moisture resistance | 10/10 | 0/10 | 1/10 | 5/10 |
| bonding strength of Ni underlying electrode layer 8 & Cu plating electrode layer 9 | small | good | good | good |

Comparative Example 1 had all 10 samples being defectively moisture resistant. In Comparative Example 1, Ni underlying electrode layer 8 does not include Cu diffused Ni underlying electrode layer 8b and Cu plating electrode layer 9 does not include Ni diffused Cu plating electrode layer 9a, so that there is small adhesion between Ni underlying electrode layer 8 and Cu plating electrode layer 9. Therefore, it is believed that, in Comparative Example 1, a gap was caused between Ni underlying electrode layer 8 and Cu plating electrode layer 9, and moisture reached the internal electrodes through the gap, resulting in defective moisture resistance.

In contrast, the Example included no defectively moisture resistant sample.

Comparative Example 2 included one defectively moisture resistant sample out of its ten samples. Non-Ni diffused Cu plating electrode layer 9b had thickness TY of about 0.4 µm, which was smaller than about 0.5 µm, and it is believed that Cu plating electrode layer 9 had reduced moisture resistance.

Comparative Example 3 included five defectively moisture resistant samples out of its ten samples. Non-Ni diffused Cu plating electrode layer 9b had thickness TY of 0 µm, and it is believed that Cu plating electrode layer 9 had further reduced moisture resistance.

By the above moisture resistance load test, it has been confirmed that preferred embodiments of the present invention are effective.

Example of a Method for Manufacturing Multilayer Ceramic Capacitor 100

A non-limiting example of a method for manufacturing multilayer ceramic capacitor 100 according to the first preferred embodiment will be described.

Initially, capacitive element 1 including internal electrodes 2 and 3 formed therein and Ni underlying electrode layer 8 formed on an external surface for external electrodes 4 to 7 is prepared.

Specifically, initially, dielectric ceramic powder, binder resin, a solvent, and the like, for example, are prepared and wet-mixed together to prepare a ceramic slurry.

Subsequently, the ceramic slurry is applied on a carrier film in the form of a sheet with a die coater, a gravure coater, a micro gravure coater or the like, for example, and dried to produce a ceramic green sheet.

Subsequently, a conductive paste prepared in advance is applied (for example, printed) in a desired pattern on a major surface of a prescribed ceramic green sheet to form internal electrodes 2 and 3. Note that the conductive paste is not applied to a ceramic green sheet which will define and function as an external layer. Note that the conductive paste can, for example, include a solvent, binder resin, metal powder (for example, Ni powder) and the like mixed together.

Subsequently, such ceramic green sheets are stacked in a prescribed order and integrated together by thermocompression bonding to produce a green capacitive element.

Subsequently, a conductive paste is applied in a desired shape on an external surface of the green capacitive element in order to form Ni underlying electrode layer 8. Note that the conductive paste can, for example, preferably include a solvent, binder resin, Ni powder, ceramic powder, and the like mixed together.

Subsequently, the green capacitive element is fired in a prescribed profile to complete capacitive element 1. In doing so, the ceramic green sheet is fired to be ceramic layer 1a, the conductive paste applied to the major surface of the ceramic green sheet is simultaneously fired to be internal electrodes 2 and 3, and the conductive paste applied on the external surface of the green capacitive element is simultaneously fired to be Ni underlying electrode layer 8.

Subsequently, Cu plating electrode layer 9 is formed on an external surface of Ni underlying electrode layer 8 for external electrodes 4 to 7. Cu plating electrode layer 9 is formed to have a thickness of about 3 µm or more and about 12 µm or less, for example.

Subsequently, capacitive element 1 including an external surface with Ni underlying electrode layer 8 and Cu plating electrode layer 9 formed thereon for external electrodes 4 to 7 is heat-treated. As a result, non-Cu diffused Ni underlying electrode layer 8a and Cu diffused Ni underlying electrode layer 8b are formed in Ni underlying electrode layer 8, and Ni diffused Cu plating electrode layer 9a and non-Ni diffused Cu plating electrode layer 9b are formed in Cu plating electrode layer 9.

The heat treatment is controlled in temperature and time to allow non-Ni diffused Cu plating electrode layer 9b to have a thickness of about 0.5 µm or more, for example. While the heat treatment's temperature may be any temperature, it can, for example, preferably be about 300° C. to about 1000° C. While the heat treatment's time may also be any period of time, it can, for example, preferably be about 1 minute to about 240 minutes. When the time is fixed, the higher the temperature, the smaller the thickness of non-Ni diffused Cu plating electrode layer 9b will be, whereas when the temperature is fixed, the longer the time, the smaller the thickness of non-Ni diffused Cu plating electrode layer 9b will be.

Subsequently, Ni plating electrode layer 10 is formed on an external surface of Cu plating electrode layer 9 for external electrodes 4 to 7. If Ni plating electrode layer 10 is formed with a solder ball used as a medium, a Sn layer may be formed at an interface of Cu plating electrode layer 9 and Ni plating electrode layer 10.

Finally, Sn plating electrode layer 11 is formed on an external surface of Ni plating electrode layer 10 to complete external electrodes 4 to 7 and, thus, multilayer ceramic capacitor 100 according to the first preferred embodiment is completed.

Note that a plating liquid used to form Sn plating electrode layer 11 may be mixed with a large amount of a surfactant, and accordingly, the plating liquid easily enters external electrodes 4 to 7, and furthermore, easily reaches internal electrodes 2 and 3. The plating liquid having reached internal electrodes 2 and 3 may produce defective characteristics (defective moisture resistance). However, multilayer ceramic capacitor 100 includes external electrodes 4 to 7 including Cu plating electrode layer 9 with thickness TX of about 3 µm or more and non-Ni diffused Cu plating electrode layer 9b with thickness TY of about 0.5 µm or more so that Cu plating electrode layer 9 has large moisture resistance, and multilayer ceramic capacitor 100 is less likely to have such defective characteristics.

Second Preferred Embodiment

Figure 5:
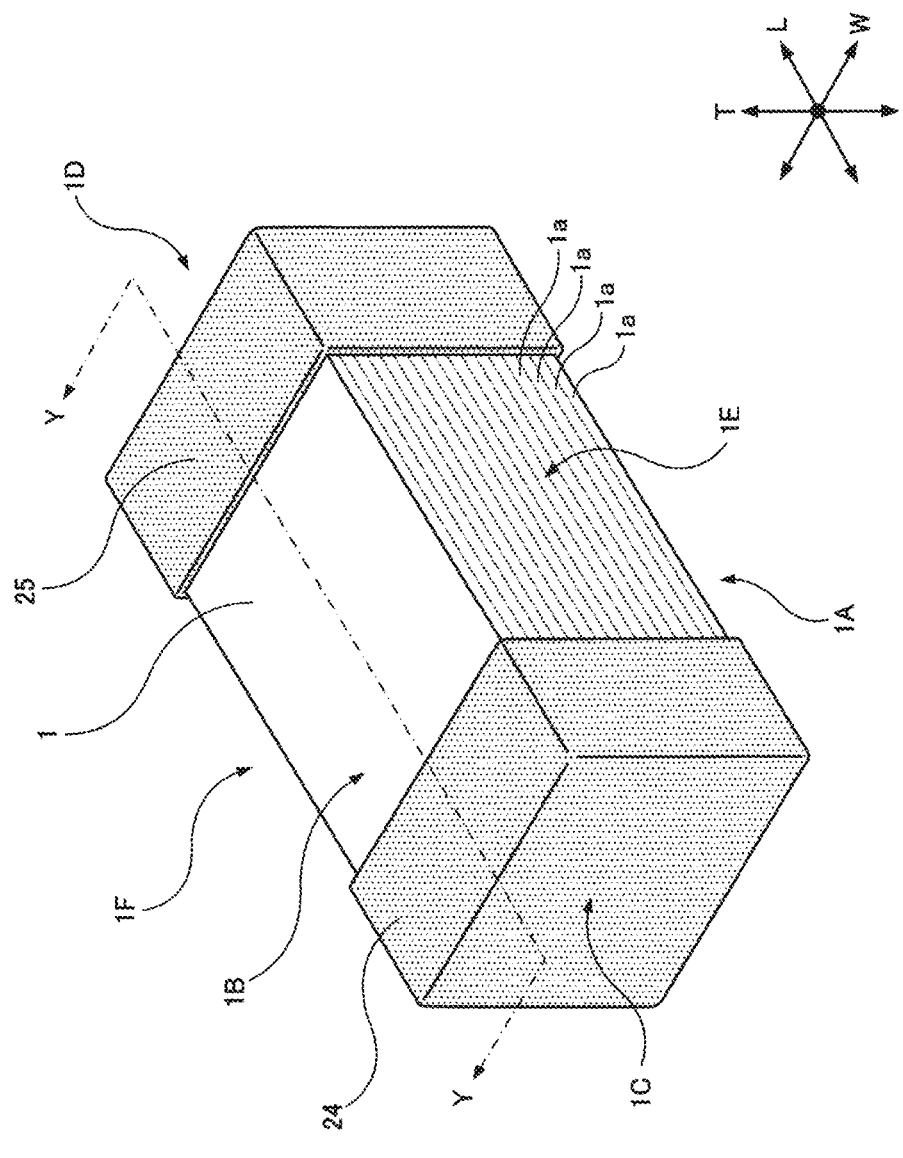
FIG. 5 is a perspective view of a multilayer ceramic capacitor 200 according to a second preferred embodiment of the present invention.
Figure 6:
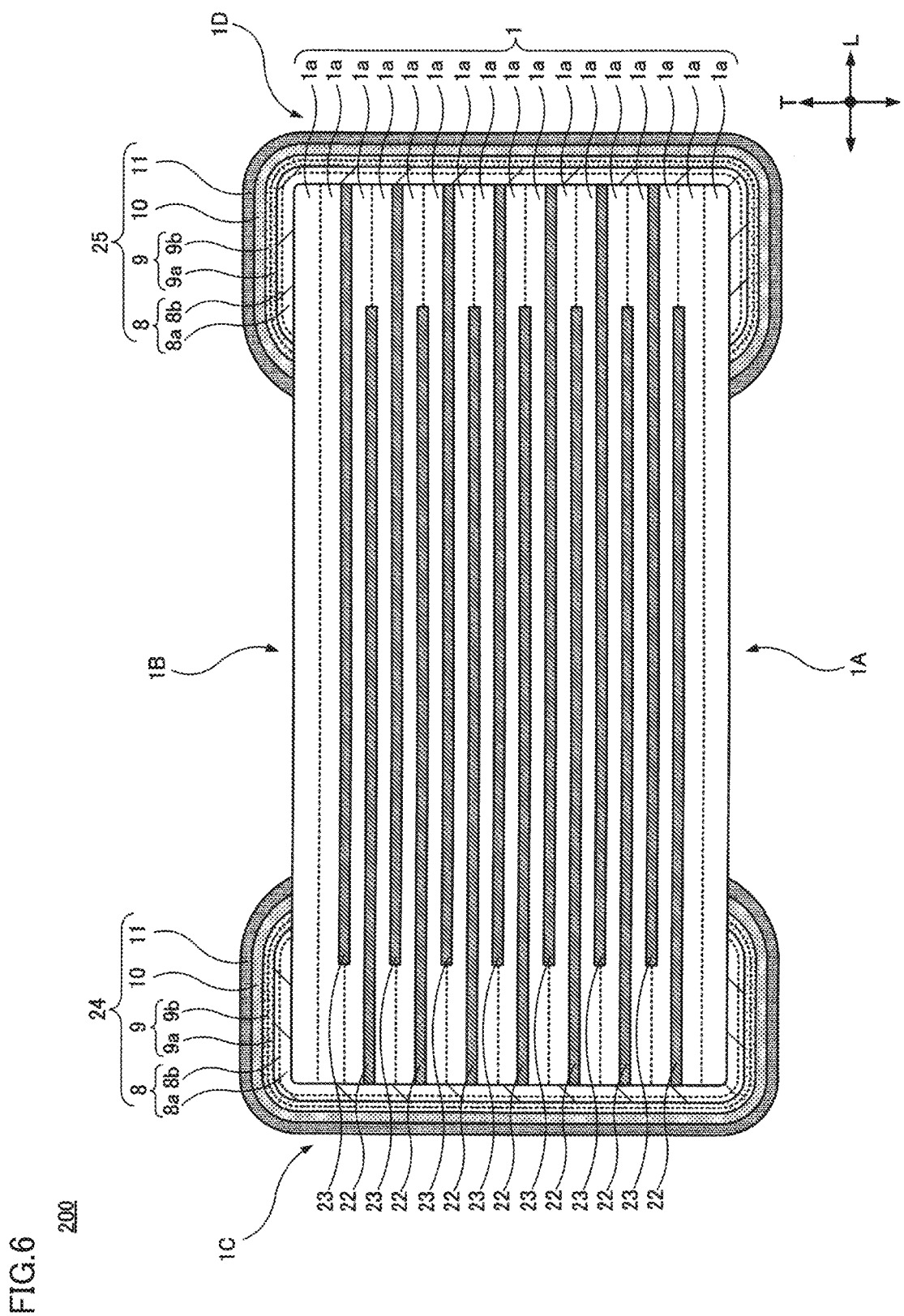
FIG. 6 is a cross section of multilayer ceramic capacitor 200.

FIGS. 5 and 6 show a multilayer ceramic capacitor 200 according to a second preferred embodiment of the present invention. FIG. 5 is a perspective view of multilayer ceramic capacitor 200. FIG. 6 is a cross section of multilayer ceramic capacitor 200, and shows a portion Y-Y indicated in FIG. 5 by an arrowed, one-dot chain line.

Multilayer ceramic capacitor 200 according to the second preferred embodiment corresponds to multilayer ceramic capacitor 100 according to the first preferred embodiment having a partially modified configuration. Specifically, while multilayer ceramic capacitor 100 is a three-terminal capacitor, multilayer ceramic capacitor 200 is preferably a two-terminal capacitor, for example.

Multilayer ceramic capacitor 200 includes capacitive element 1 including a plurality of ceramic layers 1a and a plurality of internal electrodes 22 and 23 disposed in layers. Internal electrodes 22 and 23 both extend in lengthwise direction L and have a rectangular or substantially rectangular shape in plan view. Internal electrode 22 extend to end surface 1C of capacitive element 1, and internal electrode 23 extend to end surface 1D of capacitive element 1.

External electrodes 24 and 25 are provided on an external surface of capacitive element 1.

External electrode 24 is provided on end surface 1C of capacitive element 1. External electrode 24 preferably has the shape of a cap, and includes an edge portion extending from end surface 1C of capacitive element 1 to major surfaces 1A, 1B and side surfaces 1E, 1F.

External electrode 25 is provided on end surface 1D of capacitive element 1. External electrode 25 preferably has the shape of a cap, and includes an edge portion extending from end surface 1D of capacitive element 1 to major surfaces 1A, 1B and side surfaces 1E, 1F.

In multilayer ceramic capacitor 200, internal electrode 22 extending to end surface 1C of capacitive element 1 is connected to external electrode 24. Furthermore, internal electrode 23 extending to end surface 1D of capacitive element 1 is connected to external electrode 25.

Specifically, external electrodes 24 and 25 each include Ni underlying electrode layer 8 on an external surface of capacitive element 1, Cu plating electrode layer 9 on an external surface of Ni underlying electrode layer 8, Ni plating electrode layer 10 on an external surface of Cu plating electrode layer 9, and Sn plating electrode layer 11 on an external surface of Ni plating electrode layer 10.

In multilayer ceramic capacitor 200, Ni underlying electrode layer 8 includes non-Cu diffused Ni underlying electrode layer 8a and Cu diffused Ni underlying electrode layer 8b, and Cu plating electrode layer 9 includes Ni diffused Cu plating electrode layer 9a and non-Ni diffused Cu plating electrode layer 9b.

In multilayer ceramic capacitor 200, Cu plating electrode layer 9 preferably has thickness TX of about 3 µm or more and about 12 µm or less formed, and non-Ni diffused Cu plating electrode layer 9b preferably has thickness TY of about 0.5 µm or more formed.

Thus, a multilayer ceramic capacitor according to a preferred embodiment of the present invention may be configured as a two-terminal capacitor.

Multilayer ceramic capacitors 100 and 200 according to the first and second preferred embodiments have been described above. However, the present invention is not limited to the contents described above, and various modifications can be made in accordance with the gist of the invention.

For example, while multilayer ceramic capacitors 100 and 200 include the two layers of Ni plating electrode layer 10 and Sn plating electrode layer 11 as the second plating layer, the second plating layer may be any number of layers and made of any material, and the number of layers and the material may be changed as appropriate.

Furthermore, while multilayer ceramic capacitor 100 includes two external electrodes 6 and 7 provided as an electrode to be grounded in configuring a three-terminal capacitor, external electrodes 6 and 7 may be connected on an external surface of capacitive element 1 to be a single common external electrode. In that case, while internal electrode 3 is preferably connected to the common external electrode at both side surfaces 1E and 1F of capacitive element 1, connecting the internal electrode to the common external electrode at at least one of side surfaces 1E and 1F electrically is sufficient.

In a multilayer ceramic capacitor according to a preferred embodiment of the present invention, it is also preferable that the second plating electrode layer includes a Sn plating electrode layer. In that case, the Sn plating electrode layer can improve the external electrode's solderability.

Moreover, it is also preferable that the second plating electrode layer includes a Ni plating electrode layer on an external surface of the Cu plating electrode layer and a Sn plating electrode layer on an external surface of the Ni plating electrode layer. In that case, the Ni plating electrode layer can provide soldering heat resistance and also improve adhesion, and the Sn plating electrode layer can improve solderability.

Moreover, it is also preferable that the non-Ni diffused Cu plating electrode layer has a thickness of about 1 µm or more formed. In that case, the Cu plating electrode layer can reliably maintain large moisture resistance.

Moreover, it is also preferable that the non-Ni diffused Cu plating electrode layer has a thickness of about 2 µm or more. In that case, the Cu plating electrode layer can further reliably maintain large moisture resistance.

It is also preferable that an alloy of Cu and Ni is provided in the Ni diffused Cu plating electrode layer. In that case, adhesion between the Ni underlying electrode layer and the Cu plating electrode layer is further improved.

Furthermore, it is also preferable that the Ni underlying electrode layer includes a non-Cu diffused Ni underlying electrode layer on a side closer to the capacitive element and not including Cu diffused therein, and a Cu diffused Ni underlying electrode layer on a side closer to the Cu plating electrode layer and including Cu diffused therein. In that case, adhesion between the Ni underlying electrode layer and the Cu plating electrode layer is further improved.

Furthermore, it is also preferable that the internal electrode includes a first internal electrode and a second internal electrode, and the first internal electrode is extended out of both end surfaces to an external surface of the capacitive element and connected to an external electrode and the second internal electrode is extended out of at least one side surface to an external surface of the capacitive element and connected to an external electrode to configure a three-terminal capacitor.

In a method for manufacturing a multilayer ceramic capacitor according to a preferred embodiment of the present invention, it is also preferable that the second plating electrode layer includes a Sn plating electrode layer. In that case, the Sn plating electrode layer can improve the external electrode's solderability.

Moreover, it is also preferable that the second plating electrode layer includes a Ni plating electrode layer formed on an external surface of the Cu plating electrode layer and a Sn plating electrode layer formed on an external surface of the Ni plating electrode layer. In that case, the Ni plating electrode layer can provide soldering heat resistance and also improve adhesion, and the Sn plating electrode layer can improve solderability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a capacitive element including a stack of a plurality of ceramic layers and a plurality of internal electrodes, and including a pair of major surfaces opposite to each other in a heightwise direction, a pair of end surfaces opposite to each other in a lengthwise direction orthogonal or substantially orthogonal to the heightwise direction, and a pair of side surfaces opposite to each other in a widthwise direction orthogonal or substantially orthogonal to the heightwise direction and the lengthwise direction; and
at least two external electrodes on an external surface of the capacitive element; wherein
the internal electrodes extend to an external surface of the capacitive element at the end surfaces and/or the side surfaces and are connected to the external electrodes;
the external electrodes include:
a Ni underlying electrode layer on an external surface of the capacitive element and mainly including Ni;
a Cu plating electrode layer on an external surface of the Ni underlying electrode layer; and
at least one second plating electrode layer directly on an external surface of the Cu plating electrode layer;
the Cu plating electrode layer consists of a single layer that provides a Ni diffused Cu plating electrode layer on a side closer to the Ni underlying electrode layer and including Ni diffused therein and a non-Ni diffused Cu plating electrode layer on a side closer to the second plating electrode layer and not including Ni diffused therein;
the single layer of the Cu plating electrode layer has a thickness of about 3 μm or more and about 12 μm or less; and
the non-Ni diffused Cu plating electrode layer has a thickness of about 0.5 μm or more.

2. The multilayer ceramic capacitor according to claim 1, wherein the second plating electrode layer includes a Sn plating electrode layer.

3. The multilayer ceramic capacitor according to claim 2, wherein the second plating electrode layer includes a Ni plating electrode layer on an external surface of the Cu plating electrode layer, and the Sn plating electrode layer on an external surface of the Ni plating electrode layer.

4. The multilayer ceramic capacitor according to claim 1, wherein the non-Ni diffused Cu plating electrode layer has a thickness of about 1 μm or more.

5. The multilayer ceramic capacitor according to claim 4, wherein the non-Ni diffused Cu plating electrode layer has a thickness of about 2 μm or more.

6. The multilayer ceramic capacitor according to claim 1, wherein an alloy of Cu and Ni is provided in the Ni diffused Cu plating electrode layer.

7. The multilayer ceramic capacitor according to claim 1, wherein the Ni underlying electrode layer includes a non-Cu diffused Ni underlying electrode layer on a side closer to the capacitive element and not including Cu diffused therein, and a Cu diffused Ni underlying electrode layer on a side closer to the Cu plating electrode layer and including Cu diffused therein.

8. The multilayer ceramic capacitor according to claim 1, wherein
the internal electrodes include a first internal electrode and a second internal electrode;
the first internal electrode extends out of both of the end surfaces to an external surface of the capacitive element and is connected to the external electrodes, and the second internal electrode extends out of at least one of the side surfaces to an external surface of the capacitive element and is connected to the external electrodes to define a three-terminal capacitor.

9. The multilayer ceramic capacitor according to claim 1, wherein the capacitive element is made of a dielectric ceramic material mainly including $BaTiO_3$.

10. The multilayer ceramic capacitor according to claim 1, wherein each of the plurality of ceramic layers has a thickness of about 0.3 μm to about 2.0 μm.

11. The multilayer ceramic capacitor according to claim 1, wherein the second plating electrode layer includes a plating electrode layer made of a metal different from Cu directly on an external surface of the Cu plating electrode layer.

* * * * *